(12) United States Patent
Chen et al.

(10) Patent No.: US 9,075,576 B2
(45) Date of Patent: Jul. 7, 2015

(54) KEYPADS FOR MOBILE DEVICES AND METHOD OF MANUFACTURING THE SAME

(75) Inventors: Chao Chen, Waterloo (CA); Roman Peter Rak, Waterloo (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 1051 days.

(21) Appl. No.: 12/712,482

(22) Filed: Feb. 25, 2010

(65) Prior Publication Data

US 2011/0205700 A1    Aug. 25, 2011

(51) Int. Cl.
| | | |
|---|---|---|
| *H05K 5/00* | (2006.01) | |
| *H05K 7/00* | (2006.01) | |
| *G06F 1/16* | (2006.01) | |
| *B29C 45/16* | (2006.01) | |
| B29C 51/00 | (2006.01) | |
| B29L 31/34 | (2006.01) | |
| B29L 31/46 | (2006.01) | |
| B29L 31/00 | (2006.01) | |

(52) U.S. Cl.
CPC .......... *G06F 1/1662* (2013.01); *B29C 45/1642* (2013.01); *B29C 51/00* (2013.01); *B29C 2791/001* (2013.01); *B29L 2031/3437* (2013.01); *B29L 2031/466* (2013.01); *B29L 2031/7676* (2013.01)

(58) Field of Classification Search
USPC ............. 361/679.01, 679.02, 679.08, 679.09, 361/679.3, 679.55–679.59; 341/22–34; 200/5 A, 5 D, 5 E, 302.1–302.3; 345/168–178; 379/433.1–433.13
See application file for complete search history.

(56) References Cited

U.S. PATENT DOCUMENTS

| | | | |
|---|---|---|---|
| 4,391,845 | A | 7/1983 | Denley |
| 4,421,966 | A | 12/1983 | Pounds |
| 5,367,133 | A | 11/1994 | Schmidt et al. |
| 5,734,136 | A | 3/1998 | Newcomer et al. |
| 6,180,895 | B1 | 1/2001 | Hutchinson et al. |
| 6,763,576 | B2 | 7/2004 | Watchko et al. |
| 7,423,229 | B2 | 9/2008 | Chen |
| 7,455,416 | B2 | 11/2008 | Chen |
| 7,523,544 | B2 | 4/2009 | Hsu |

(Continued)

FOREIGN PATENT DOCUMENTS

| | | |
|---|---|---|
| EP | 0845795 A2 | 6/1998 |
| EP | 1028445 A2 | 8/2000 |

(Continued)

OTHER PUBLICATIONS

Ichia Technologies; http://www.ichia.com/eng/products/products_3.1.1.1.1.htm; retrieved Feb. 25, 2010.

(Continued)

*Primary Examiner* — Jerry Wu
(74) *Attorney, Agent, or Firm* — Fleit Gibbons Gutman Bongini & Bianco P.L.

(57) ABSTRACT

A keypad is described herein in which the keypad can have a keypad sheet and a keymat layer molded onto the back side of the keypad sheet. The keypad sheet can include a plurality of keys formed on a front side of the keypad sheet and a plurality of actuators formed on a back side of the keypad sheet and protruding from the back side of the keypad sheet. Slits are cut around at least some of the keys to provide the keys with flexibility. The slits do not pierce the keymat layer.

19 Claims, 10 Drawing Sheets

(56) References Cited

U.S. PATENT DOCUMENTS

| | | |
|---|---|---|
| 2002/0190875 A1 | 12/2002 | Hentunen |
| 2003/0025118 A1 | 2/2003 | Yamazaki |
| 2003/0160712 A1 | 8/2003 | Levy |
| 2003/0201983 A1 | 10/2003 | Jokinen |
| 2003/0223577 A1 | 12/2003 | Ono |
| 2004/0232413 A1 | 11/2004 | Yamazaki |
| 2007/0120710 A1* | 5/2007 | Rak et al. .................. 341/22 |
| 2008/0191904 A1 | 8/2008 | Tsao |
| 2009/0207054 A1 | 8/2009 | Rak |
| 2011/0073454 A1* | 3/2011 | Chen et al. ................. 200/5 A |
| 2011/0115652 A1* | 5/2011 | Werner et al. ............... 341/24 |

FOREIGN PATENT DOCUMENTS

| | | |
|---|---|---|
| EP | 1589405 A2 | 10/2005 |
| EP | 1959468 A1 | 8/2008 |
| EP | 2071601 A1 | 6/2009 |
| EP | 2104126 A1 | 9/2009 |

OTHER PUBLICATIONS

Gotada Hitech Co., Ltd.; http://rubber.tip.com/rubber_products_keypads.asp; retrieved Feb. 25, 2010.

http://www.grayhill.com/keypads/default.aspx; retrieved Nov. 2, 2011.

Partial Search Report dated Jul. 19, 2010. In corresponding application No. 10154745.3.

Extended European Search Report dated Nov. 29, 2010. In corresponding application No. 10154745.3.

Article 94(3) EPC from related European Patent Application No. 10154745.3 dated Oct. 7, 2013; 4 pages.

Canadian Office Action from related Canadian Patent Application No. 2,732,304 dated Oct. 25, 2012; 2 pages.

Canadian Office Action from related Canadian Patent Application No. 2,732,304 dated Oct. 23, 2013; 2 pages.

Canadian Office Action from related Canadian Patent Application No. 2,732,304 dated Jul. 28, 2014; 2 pages.

* cited by examiner

KEYPADS FOR MOBILE DEVICES AND METHOD OF MANUFACTURING THE SAME

FIELD OF TECHNOLOGY

The subject matter herein generally relates to mobile devices and in particular, to keypads for mobile devices.

BACKGROUND

A keypad assembly is an important component of a mobile device because it can be used to enter letters, numbers, or signs, and to produce actions or commands. A keypad assembly generally includes a main printed circuit board (PCB), a dome sheet carrying a plurality of dome switches (domes) disposed on the main PCB, and a keypad having keys on the front side and corresponding actuators on the back side. When a key is pressed, the actuator collapses the corresponding dome, which connects the circuit on the PCB and produces the intended action of the key.

There are different styles of keypads for mobile devices. One style is the so-called film-in-plastic (FIP) keypad, which is manufactured by thermo forming a polycarbonate (PC) film to the shape of the key caps and then plastic injection molding hard or relatively inflexible actuators into the back side of each key cap pocket. Slits are cut around some of the keys to make the keys more flexible and easier to be pressed down.

However, the existing design of the FIP style keypads has a number of drawbacks. First, the process of injection molding the hard actuators is not exact, which can result in gaps being present between the actuators and the domes following the assembly of the keypad into a mobile device. These gaps can make the keypad feel as if there is a loss of structural integrity during operation, as the keypad may slide in various directions while the keys are depressed. This phenomenon is referred to as keypad floating. Second, the slits cut around the keys can expose the dome sheet and the main PCB to outside dust, water or other contaminants. Third, the hard actuators can generate an abrupt and stiff tactile feedback response when they strike the corresponding domes, which can also cause a greater amount of noise to be produced during the interaction when compared to other keypads. Finally, the hard actuators, in view of their relative inflexibility, allow for a shorter key travel, which can degrade the tactile feedback quality of the keypad.

BRIEF DESCRIPTION OF THE DRAWINGS

Embodiments of the present application will now be described, by way of example only, with reference to the attached Figures, wherein.

DETAILED DESCRIPTION

Figure 1:
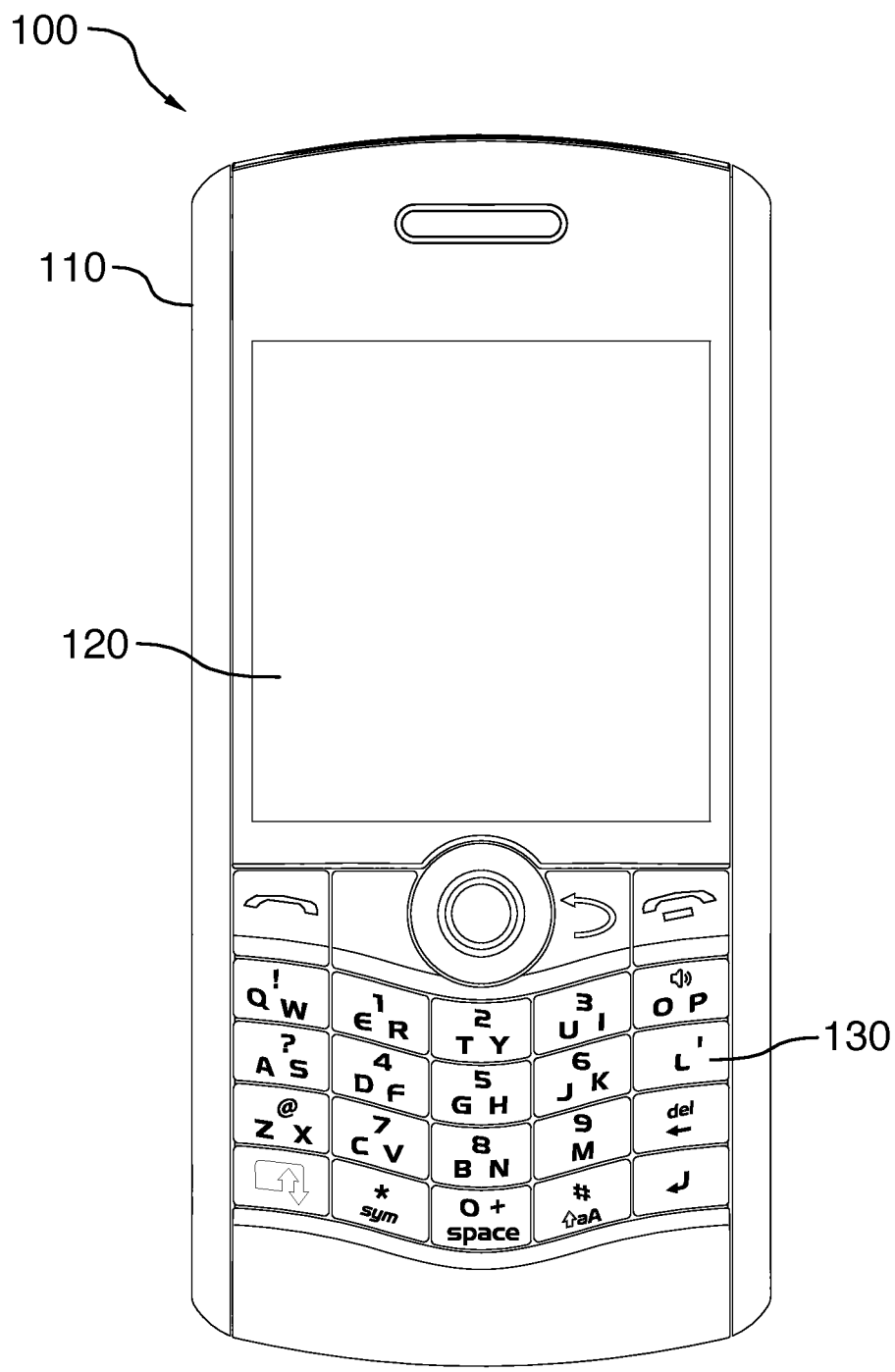
FIG. 1 illustrates an example of a mobile device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Several definitions that apply throughout this document will now be presented. The term "mobile device" is defined as any electronic device that is capable of at least accepting information entries or commands from a user and includes its own power source. The term "keypad" is defined as an interface through which a user may enter commands, including text-based, voice-based or even visual-based commands. The term "dome" is defined as a switch that includes a collapsible component that completes an electrical contact when a force above a threshold is applied to the collapsible component. A "slit" is defined as a cut or opening in a surface. The term "pierce" is defined as a complete penetration of a surface or material. The term "molding" or "molded" is defined as a process of forming articles by heating a material until it can flow and be injected into a mold or a state following such a process. The term "pre-load force" is defined as a force exerted on a first object by a second object that is insufficient to cause the second object to transition from a first state to a second state but is designed to supplement a force that is sufficient to transition the second object from the first state to the second state. An "actuator" is defined as a projection of a key that directly or indirectly interacts with a dome when the key is used for entry of information.

As noted earlier, the conventional FIP style keypads used for mobile devices typically have gaps between the hard actuators and the domes, which cause keypad floating. The slits cut around the keys to provide flexibility for the keys can also expose the domes and the main PCB to external contaminants. The hard actuators further generate an abrupt and stiff tactile feedback response, which can cause a greater amount of noise and produces a shorter key travel. A keypad that overcomes these drawbacks is presented herein.

In one arrangement, the keypad can have a keypad sheet that can include a plurality of keys formed on a front side of the keypad sheet and a plurality of actuators formed on a back side of the keypad sheet. The actuators can protrude from the back side of the keypad sheet. Slits can be cut around at least some of the keys to provide the keys with flexibility. The keypad can further include a keymat layer molded onto the back side of the keypad sheet. The slits can be cut in a way such that they do not pierce the keymat layer. The keymat layer can function as a barrier to prevent external contaminants from entering the keypad, thus protecting the domes and other components. The keymat layer can be made of flexible material, such as silicon rubber. The areas of the keymat layer corresponding to the actuators can fill the gap between the hard actuators and the domes, thus preventing keypad floating. Due to the flexibility of the keymat layer, the keypad can also improve tactile feedback, reduce noise, and allow for a longer key travel.

Referring to FIG. 1, an example of a mobile device 100 is shown. In one arrangement, the mobile device 100 can include a housing 110, a display 120, and a keypad 130. The keypad 130 can include a keyfield having alphanumeric keys arranged in a keyboard layout, numeric keys, and other function keys. The keypad 130 can be of various styles, including the FIP style keypad as discussed below. While in the illustrated embodiment the mobile device 100 is a handheld wireless communication device, the mobile device 100 can be any of the following: a personal digital assistant (PDA), a handheld electronic device, a non-handheld wireless communication device, a pager, a cellular phone, a cellular smart-phone, a wireless organizer, a wirelessly enabled notebook computer and the like. It is understood that the mobile device 100 is not necessarily limited to the configurations shown in FIG. 1.

Figure 2:
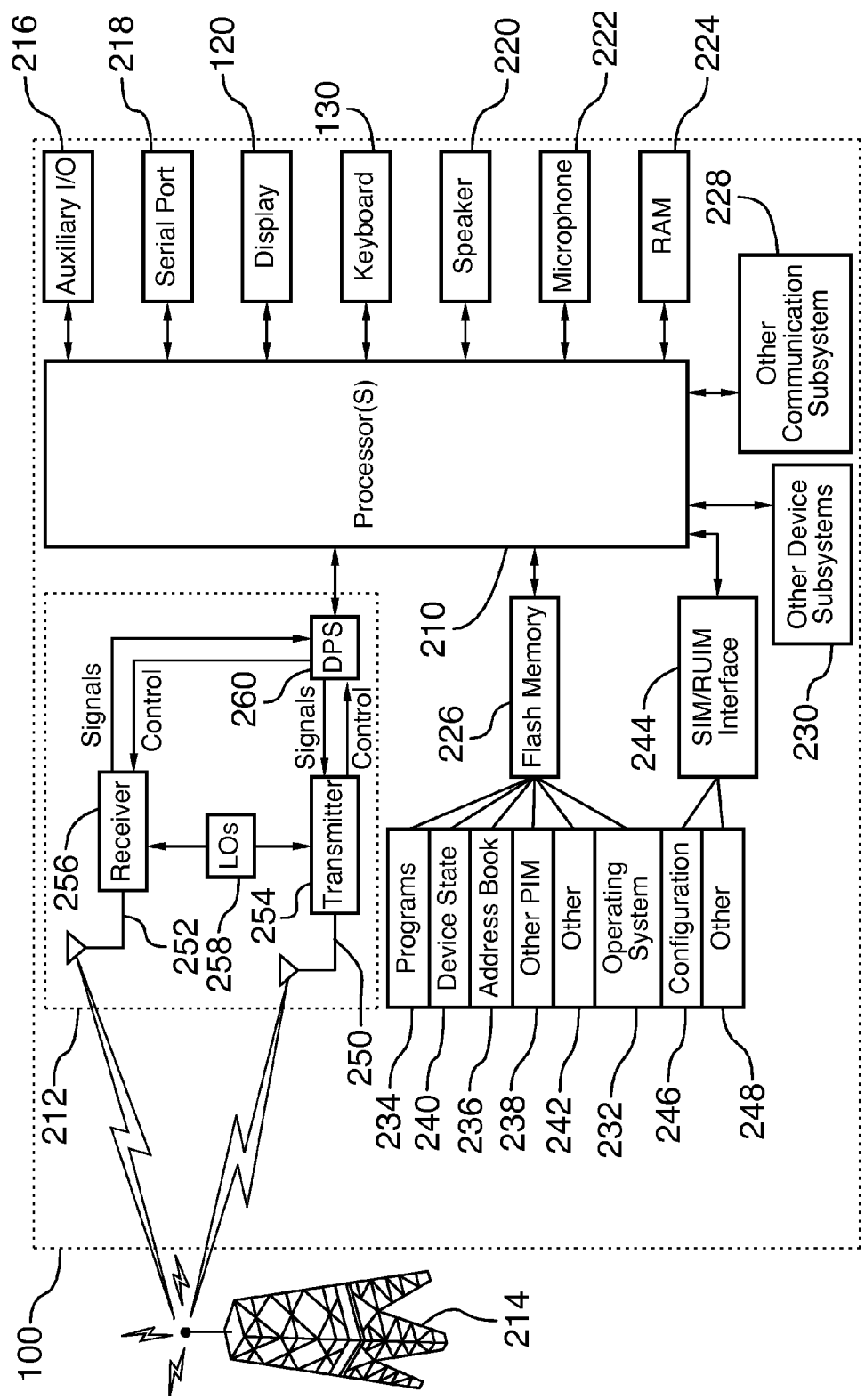
FIG. 2 illustrates an example of a block diagram of several exemplary components that can be part of the mobile device of FIG. 1.

Referring to FIG. 2, an example of a block diagram of some of the components that make up the mobile device 100 is shown. The mobile device 100 can include a processor 210 that can control the operation of the mobile device 100. A communication subsystem 212 can perform all communication transmission and reception with a wireless network 214. The processor 210 can further be coupled to an auxiliary input/output (I/O) subsystem 216, which can be coupled to the mobile device 100. In at least one embodiment, the processor 210 can be coupled to a serial port (for example, a Universal Serial Bus port) 218, which can allow for communication with other devices or systems. The display 120 can be coupled to the processor 210 to allow for displaying of information to an operator of the mobile device 100. The keypad 130 (or keyboard) can also be coupled to the processor 210.

The mobile device 100 can include a speaker 220, a microphone 222, random access memory (RAM) 224 and flash memory 226, all of which can be coupled to the processor 210. Other similar components can be provided on the mobile device 100 and optionally coupled to the processor 210. Other communication subsystems 228 and other communication device subsystems 230 are generally indicated as being functionally coupled with the processor 210, as well. An example of a communication subsystem 228 is that of a short range communication system, such as BLUETOOTH® communication module or a WI-FI®, communication module (a communication module in compliance with IEEE 802.11 set of protocols) and associated circuits and components.

The processor 210 is able to perform operating system functions and can enable execution of programs on the mobile device 100. In some embodiments, not all of the above components may be included in the mobile device 100. For example, in at least one embodiment, the keypad 130 is not provided as a separate component and is displayed as required on a dynamic touch display (not shown). In an embodiment having a dynamic touch display, the keypad 130 can be displayed as a touchscreen keypad (not shown). A touchscreen module (not shown) can be incorporated in such an embodiment such that it is in communication with the processor 210. When inputs are received on the touchscreen keypad, the touchscreen module can send or relay messages corresponding to those inputs to the processor 210.

The auxiliary I/O subsystem 216 can take the form of a navigation tool, such as an optical trackpad, a thumbwheel, a mechanical trackball, a joystick, a touch-sensitive interface, or some other I/O interface. Other auxiliary I/O subsystems can include external display devices and externally connected keyboards (not shown). While the above examples have been provided in relation to the auxiliary I/O subsystem 216, other subsystems capable of providing input or receiving output from the mobile device 100 are considered within the scope of this disclosure. Other keys or buttons can be placed along the side of the mobile device 100 to function as escape keys, volume control keys, scrolling keys, power switches, or user programmable keys, and can likewise be programmed accordingly.

Furthermore, the mobile device 100 can be equipped with components to enable operation of various programs, as shown in FIG. 2. In an exemplary embodiment, the flash memory 226 can be enabled to provide a storage location for an operating system 232, device programs 234 and data. The operating system 232 can generally be configured to manage other programs 234 that are also stored in flash memory 226 and executable on the processor 210. The operating system 232 can honor requests for services made by programs 234 through predefined program 234 interfaces. More specifically, the operating system 232 can typically determine the order in which multiple programs 234 are executed on the processor 210 and the execution time allotted for each program 234, manage the sharing of flash memory 226 among multiple programs 234, handle input and output to and from other device subsystems 230, and so on. In addition, operators can typically interact directly with the operating system 232 through a user interface, which can include the display 120 and the keypad 130. While in an exemplary embodiment, the operating system 232 is stored in flash memory 226, the operating system 232 in other embodiments is stored in read-only memory (ROM) or a similar storage element (not shown). As those skilled in the art will appreciate, the operating system 232, the device program 234 or parts thereof can be loaded in RAM 224 or some other volatile memory.

In one exemplary embodiment, the flash memory 226 can contain programs 234 for execution on the mobile device 100, including an address book 236, a personal information manager (PIM) 238 and the device state 240. Furthermore, programs 234 and other information 242 including data can be segregated upon storage in the flash memory 226 of the mobile device 100.

When the mobile device 100 is enabled for two-way communication within the wireless communication network 214, it can send and receive messages from a mobile communication service. Examples of communication systems enabled for two-way communication can include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX) networks, Long Term Evolution (LTE) networks and other networks that can be used for data and voice, or just data or voice.

For the systems listed above, the mobile device 100 can require a unique identifier to enable the mobile device 100 to transmit and receive messages from the communication network 214. Other systems may not require such identifying information. As an example, GPRS, UMTS, and EDGE use a Subscriber Identity Module (SIM) in order to allow communication with the communication network 214. Likewise, most CDMA systems use a Removable User Identity Module (RUIM) to communicate with the CDMA network. The RUIM and SIM card can be used in multiple different mobile devices 100. The mobile device 100 can be able to operate some features without a SIM/RUIM card. A SIM/RUIM interface 244 located within the mobile device 100 can allow for removal or insertion of a SIM/RUIM card (not shown). The SIM/RUIM card can feature memory and can hold key configurations 246, and other information 248, such as identification and subscriber related information. With a properly enabled mobile device 100, two-way communication between the mobile device 100 and communication network 214 is possible.

The two-way communication enabled mobile device 100 can both transmit and receive information from the communication network 214. The transfer of communication can be from the mobile device 100 or to the mobile device 100. To communicate with the communication network 214, the mobile device 100 in the presently described exemplary embodiment is equipped with an integral or internal antenna 250 for transmitting messages to the communication network 214. Likewise, the mobile device 100 in the presently described exemplary embodiment can be equipped with another antenna 252 for receiving communication from the communication network 214. These antennae (250, 252), in another exemplary embodiment, can be combined into a single antenna (not shown). As one skilled in the art would appreciate, the antenna or antennae (250, 252) in another embodiment can be externally mounted on the mobile device 100. The mobile device 100 can also have a transmitter 254 and a receiver 256, which can be respectively coupled to antennae (250, 252), and can also include one or more local oscillators 258 for processing the incoming or outgoing RF signals. The mobile device 100 can also have a digital signal processor (DSP) 260 to assist in the processing of the incoming and outgoing signals.

Figure 3:
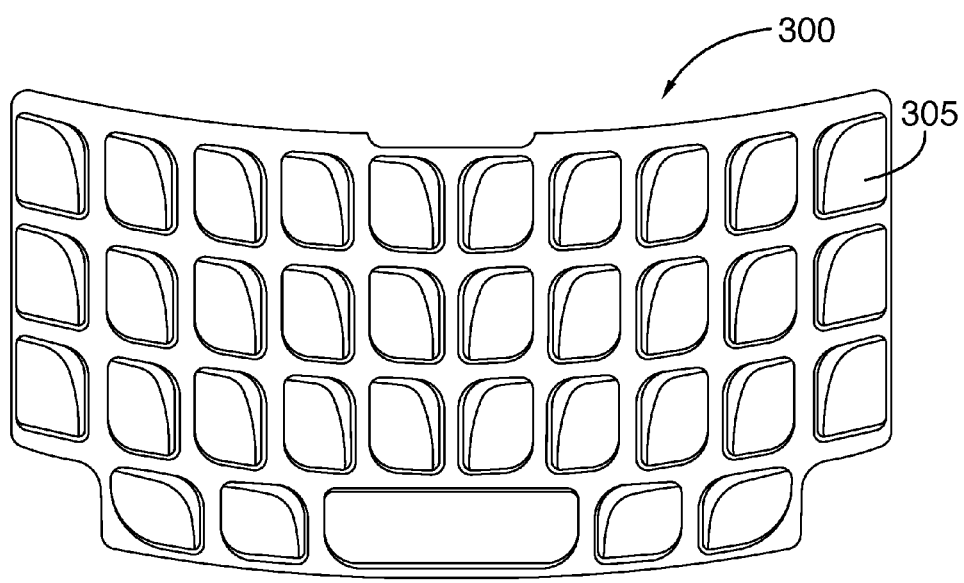
FIG. 3 illustrates a front view of an exemplary keypad sheet.
Figure 4:
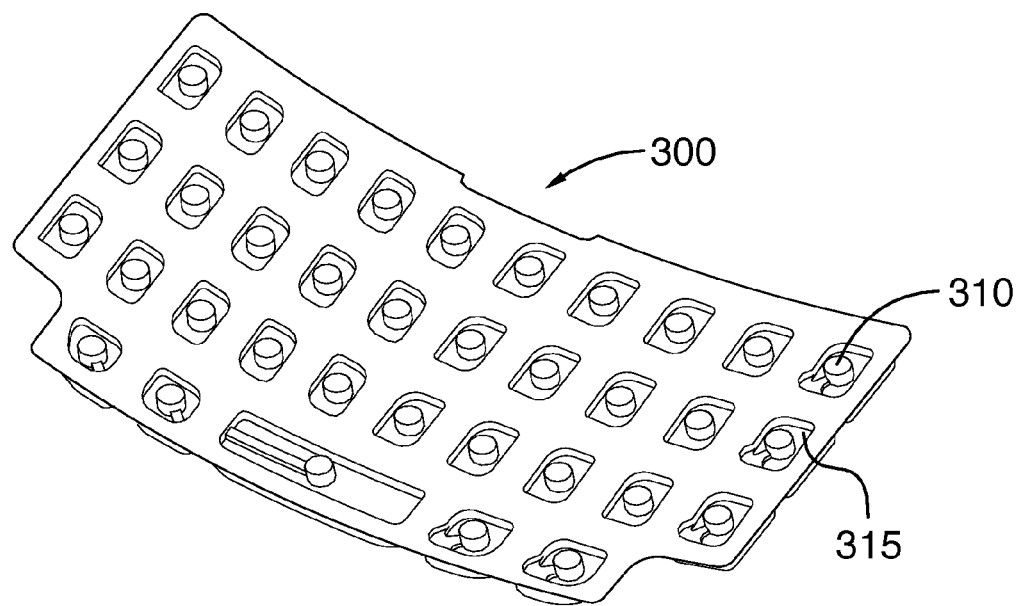
FIG. 4 illustrates a back view of the keypad sheet of FIG. 3.

Referring to FIGS. 3 and 4, a front view and a back view of a keypad sheet 300 are shown respectively. The keypad sheet 300 can be part of a keypad that can be implemented in the mobile device 100 of FIG. 1, although it is understood that the keypad sheet 300 can be assembled into other suitable components. The keypad sheet 300 can be made from a film such as a PC film. As can be seen from FIG. 3, a plurality of raised keys 305 can be thermo formed on a front side of the keypad sheet 300. As can be seen from FIG. 4, a plurality of actuators 310 can be formed by injection molding them on a back side of the keypad sheet 300. The actuators 310 can be formed into each key pocket 315 of a corresponding key 305 and protrude from the back side of the keypad sheet 300. The actuators 310, after the keypad is installed into a mobile device, can contact domes (not shown here) and cause them to collapse when the keys 305 are pressed to allow any inputs to be entered into the mobile device.

It is understood that the keypad sheet 300 is not limited to the particular configuration shown in FIGS. 3 and 4. For example, the keypad sheet 300 may contain a different number of raised keys 305 as compared to the number pictured here and the keys 305 may be shaped differently. Moreover, the keys 305 do not necessarily have to be raised, as they can be simply flat or even positioned below a base surface of the keypad sheet 300. Additionally, not every key 305 requires a corresponding actuator 310, and some keys 305 may have more than one corresponding actuator 310.

Figure 5:
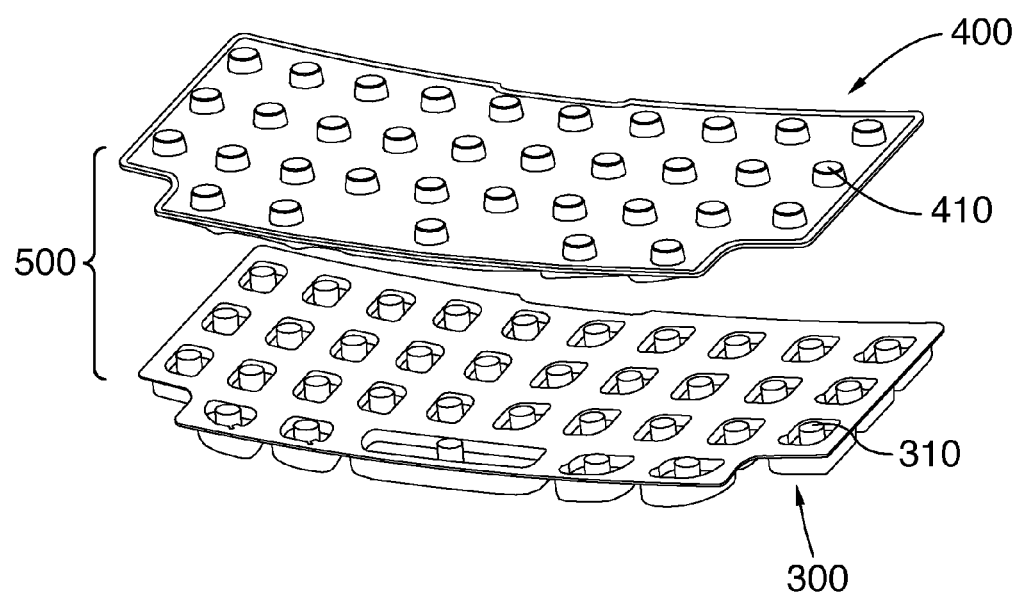
FIG. 5 illustrates an exploded back view of the keypad sheet of FIG. 3 with an exemplary keymat layer.
Figure 6:
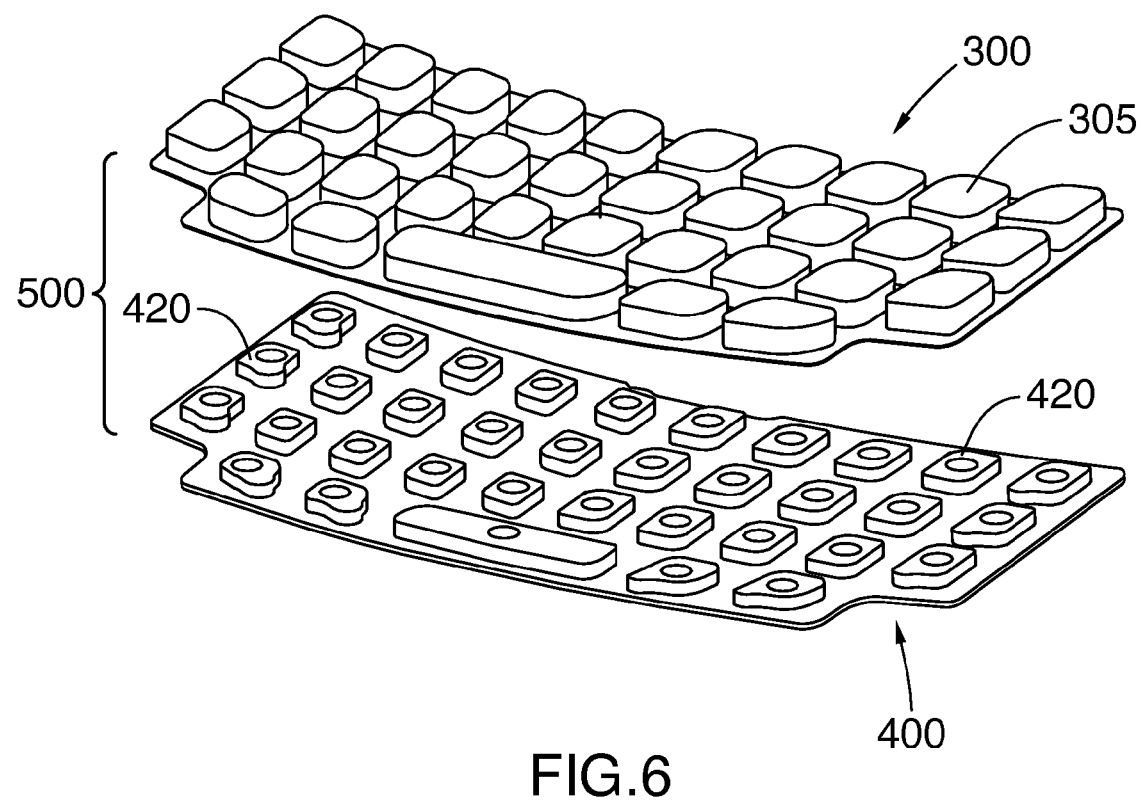
FIG. 6 illustrates an exploded front view of the keypad sheet with the keymat layer of FIG. 5.

Referring to FIGS. 5 and 6, an exploded back view and front view of the keypad sheet 300 of FIGS. 3 and 4 with an additional keymat layer 400 are shown, respectively. The keymat layer 400 can be a layer of flexible material—such as, for example, silicon rubber—that can be molded onto the back side of the keypad sheet 300. The keypad sheet 300 and the keymat layer 400 together form the keypad 500. The keymat layer 400 can be formed with a plurality of protrusions 410 (see FIG. 5) in areas corresponding to the actuators 310 on the back side of the keypad sheet 300. As best shown in FIG. 6, the keymat layer 400 can include a plurality of receptacles 420 that can accept the actuators 310 of the keypad sheet 300. This configuration can help secure the keypad sheet 300 to the keymat layer 400. In addition, the keymat layer 400 can have a larger thickness in areas corresponding to the actuators 310 than in areas between the keys 305. The thickness of the protrusions 410 can be selected so that the protrusions 410 can fill a gap between the actuators 310 and the domes (not shown here) when the keypad 500 is assembled within a mobile device. Since the keymat layer 400 is made of flexible material, the protrusions 410 can be slightly depressed following assembly so as to apply a preload force to the domes.

Figure 7:
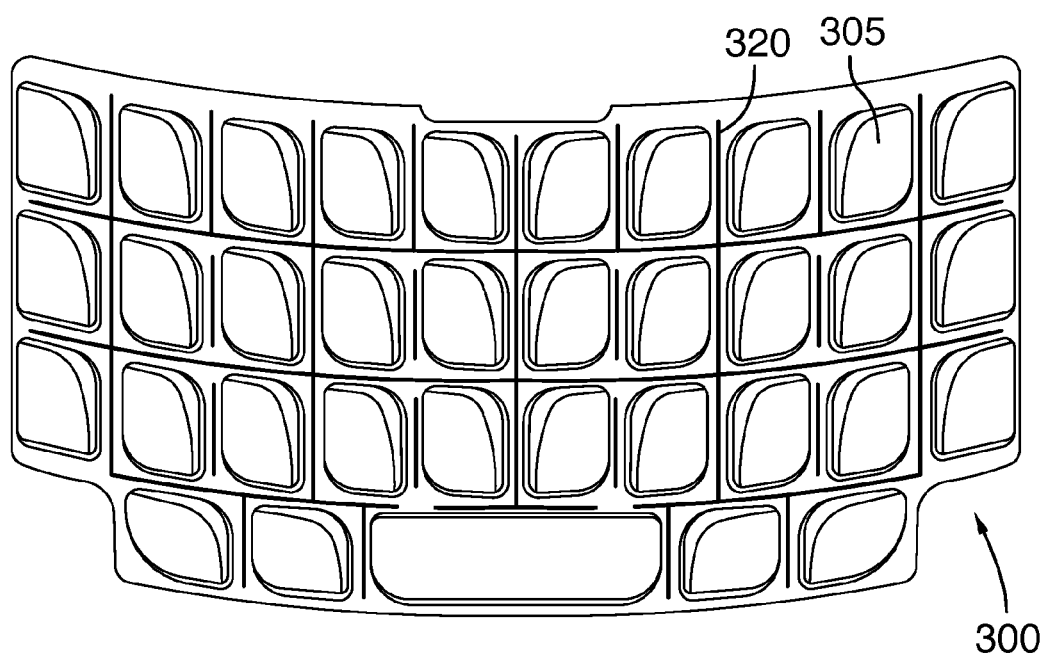
FIG. 7 illustrates the keypad sheet of FIG. 3 with slits being cut around the keys.

Referring to FIG. 7, the keypad sheet 300 of FIG. 3 is shown with slits 320 being cut around the keys 305 so that the keys 305 can be more flexible and can move easily when being pressed. As an example, the slits 320 can be cut by laser etching before or after the keymat layer 400 is molded onto the keypad sheet 300. In either arrangement, the slits 320 can pierce the keypad sheet 300 to provide a sufficient amount of flexibility for the keys 305. If the slits 320 are cut after the keymat layer 400 is molded onto the keypad sheet 300, however, the slits 320 can be cut in a way that the slits 320 pierce the keypad sheet 300 but do not pierce the keymat layer 400. As such, the keys 305 can maintain their flexibility, but the keymat layer can be a barrier to external contaminants, such as dust, water, to protect the domes and other components of the mobile device 100.

Figure 8:
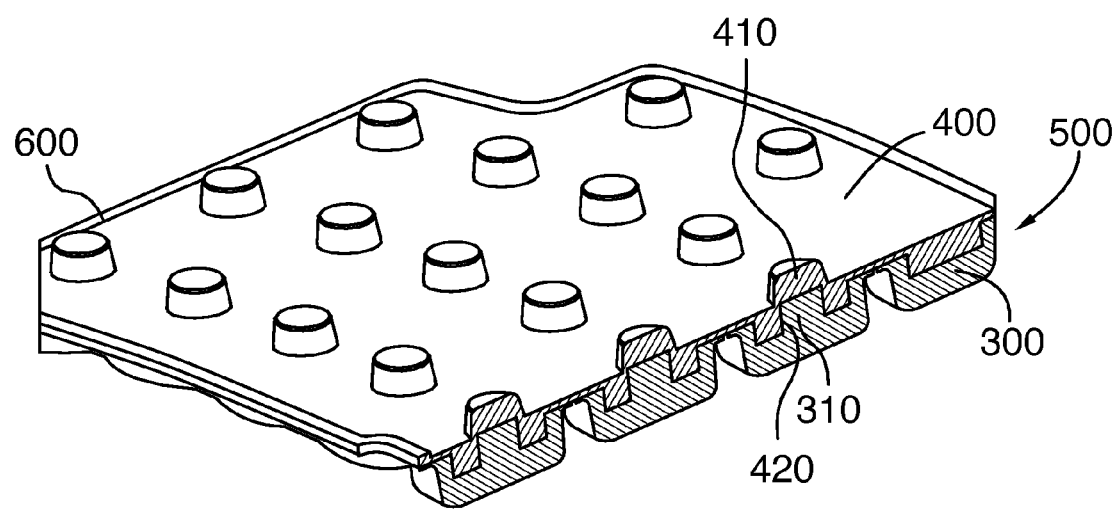
FIG. 8 illustrates a cross-sectional view of the keypad sheet with the keymat layer of FIG. 5 molded on the back side thereof.

Referring to FIG. 8, a cross-sectional view of the keypad sheet 300 with the keymat layer 400 molded on the back side thereof is shown. As can be seen, the actuators 310 can fit within the receptacles 420 of the keymat layer 400. As can also be seen, the protrusions 410 can be formed on top of the corresponding actuators 310 and can fill a gap between the actuators 310 and the domes (not shown here) when the keypad 500 is assembled within the mobile device 100. This can prevent or minimize keypad floating. Since the protrusions 410 are made of flexible material, they can also provide a longer key travel and softer tactile feel to the users, as will be described in more detail below.

In addition, a sealing ring 600 can be formed along at least a portion of the outline of the keypad 500. When the keypad 500 is installed within the mobile device 100, for example, the housing 110 of the mobile device 100 can apply forces to the sealing ring 600 so as to create a sealing along the edges of the keypad 500. This provides additional protection to components inside the mobile device 100. In one arrangement, the sealing ring 600 can be integrated into the design of the keymat layer 400. In another arrangement, the sealing ring 600 can be a discrete component that can be attached or secured to the keymat layer 400. Additionally, the sealing ring 600 can be made of the same material as the keymat layer 400, although other suitable substances can be used.

Figure 9A:
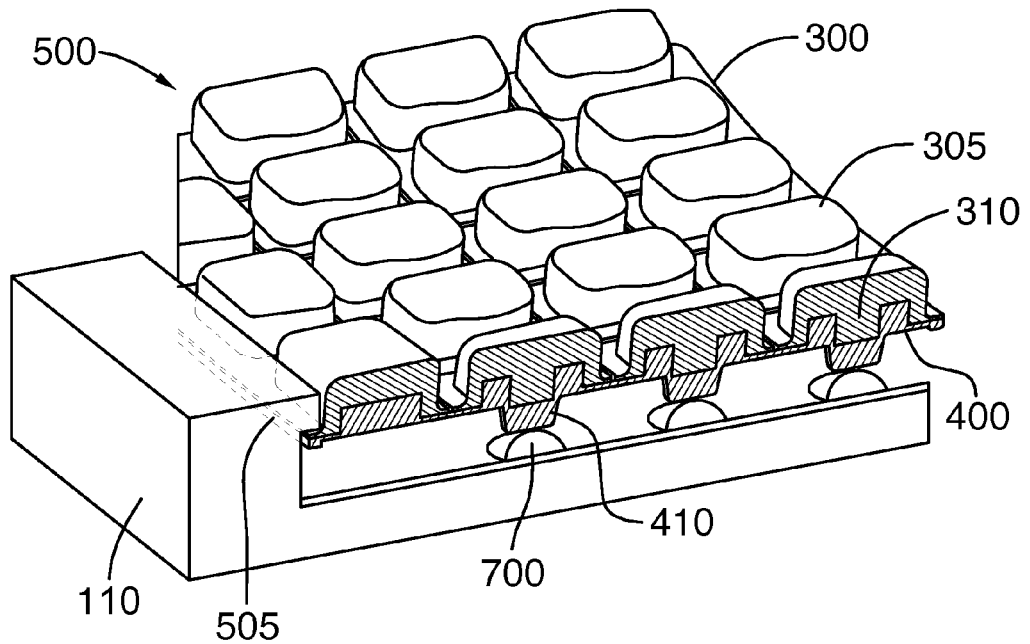
FIG. 9A illustrates a schematic partial view of the keypad sheet and keymat layer of FIG. 5 installed within a housing of a mobile device.

Referring to FIG. 9A, a schematic partial view of the keypad 500 installed within the housing 110 of the mobile device 100 is shown. As can be seen, the keymat layer 400 can be positioned between the keypad sheet 300 and a plurality of domes 700 of the mobile device 100. The thickness of the protrusions 410 can be so chosen that the protrusions 410 can contact the corresponding domes 700 and the contact can cause the protrusions 410 to be slightly depressed so as to provide a pre-load force to the domes 700. The housing 110 can press on an edge 505 of the keypad 500 to supplement the pre-load force on the domes 700. The pre-load force can be a result of both of the forces of the domes 700 pushing up and the protrusions 410 pushing down. The pre-load force and the overall configuration of the keypad 500 can provide a better tactile feel for the users.

Figure 9B:
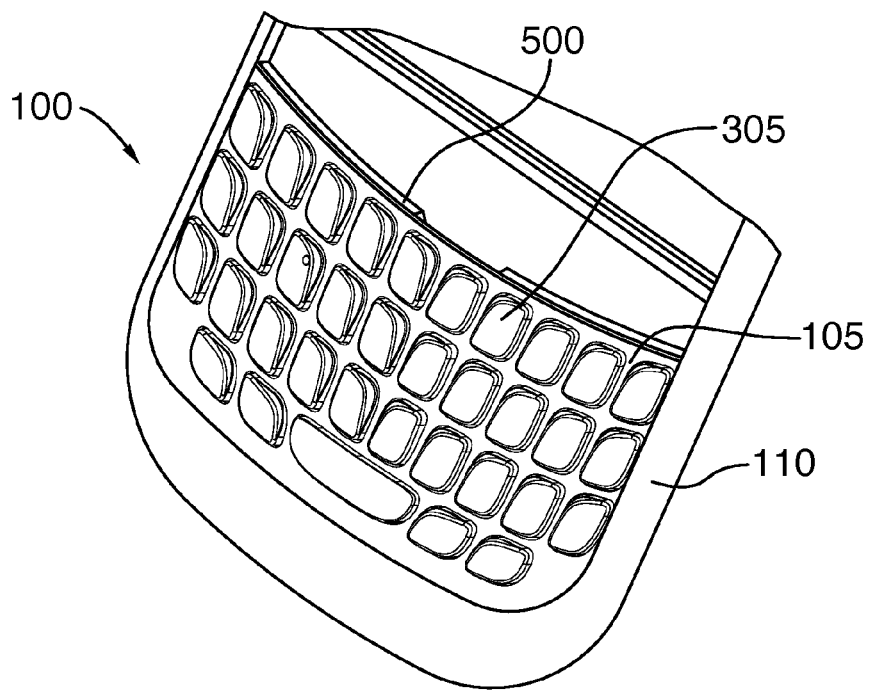
FIG. 9B illustrates a partial front view of a mobile device in which grids are used for installing the keypad into the housing.

Referring to FIG. 9B, a partial front view of the mobile device 100 is shown. As can be seen, grids 105 can be additionally provided for installing the keypad 500, which lacks rigidity because of its FIP style, into the housing 110. The grids 105 can fit into the areas between the keys 305 in order to provide the rigidity to secure the keypad 500 into the mobile device 100. The grids 105 can be an integral part of the housing 110 or can be a separate part that is assembled into the housing 110. Alternatively, the grids 105 can be assembled onto the keypad 500 first and then assembled into the housing 110. The grids 105 can also press on the areas between the keys 305 to supplement the pre-load force on the domes 700.

For example, because the protrusions 410 can contact the domes 700 and in view of the pre-load force, any pre-existing gap between the actuators 310 and the domes 700 can be eliminated or significantly reduced. This arrangement can prevent the issue of a floating keypad from surfacing. Moreover, the keymat layer 400, because it can be made of a relatively soft material, can reduce the noise from the actuators 310 striking the domes 700, which can make keypad strokes quieter. Also, because the keymat layer 400 can be constructed of a deformable material, the length that the keys 305 can travel when pressed can be increased, as the protrusions 410 can slightly collapse during such a keystroke. In addition to these features, the keymat layer 400, as described above, can protect the domes 700 and other components of the mobile device 100 from external contaminants.

Figure 10:
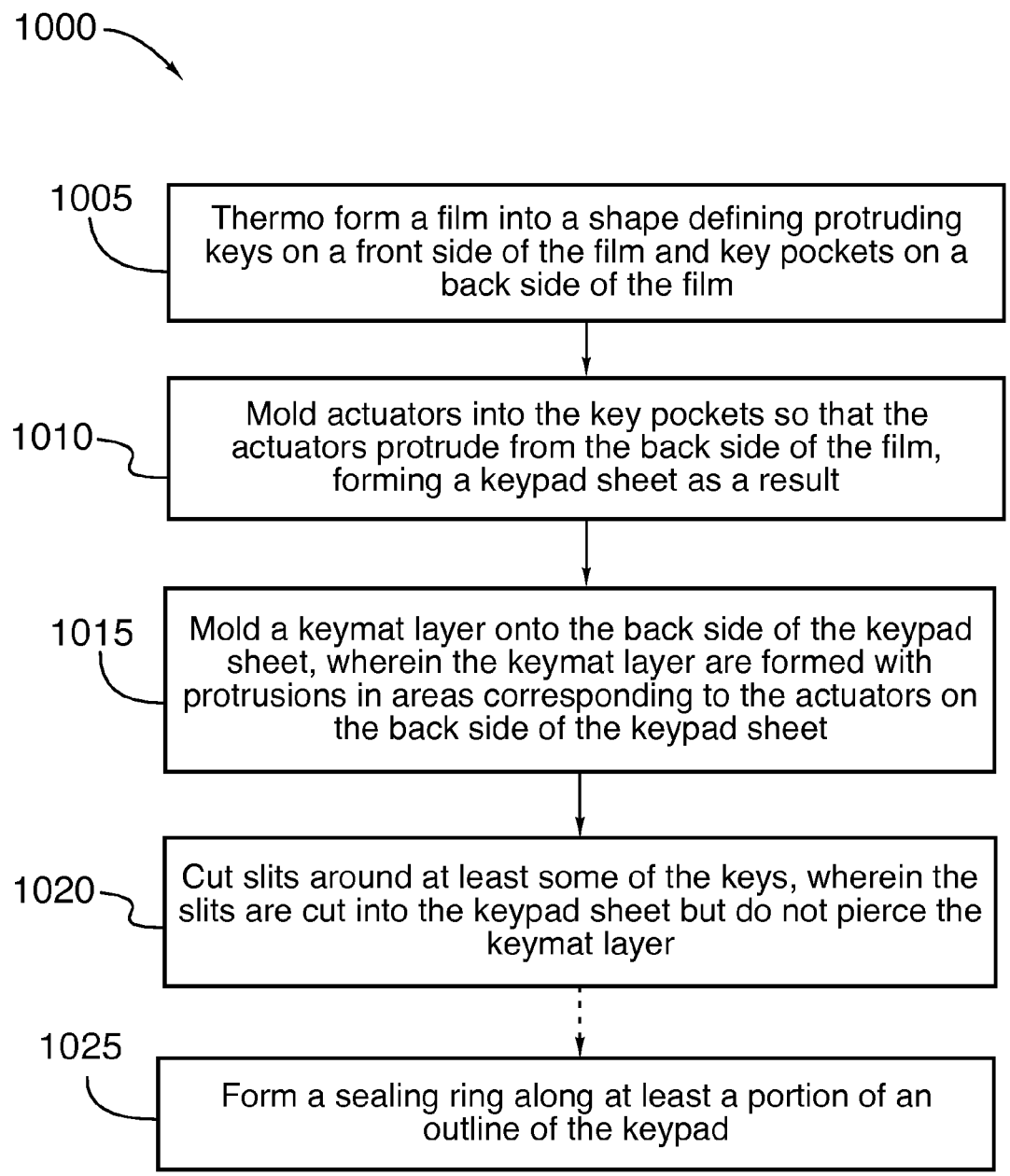
FIG. 10 illustrates an example of a method of manufacturing a keypad.

Referring to FIG. 10, a method 1000 of manufacturing a keypad is shown. It is understood that the steps of the method 1000 are not limited to the particular order in which they are presented here. The method 1000 may also include a greater (or even fewer) number of steps than that which is illustrated in FIG. 10. At step 1005, a film can be thermo formed into a shape defining protruding keys on a front side of the film and key pockets on a back side of the film in which the key pockets can correspond to the keys. At step 1010, actuators can be molded into the key pockets so that the actuators can protrude from the back side of the film. The formed film can be referred to as a keypad sheet. At step 1015, a keymat layer can be molded onto the back side of the keypad sheet in which the keymat layer can be formed with protrusions in areas corresponding to the actuators on the back side of the keypad sheet. The keymat layer can be made of flexible material and have a larger thickness in areas corresponding to the actuators than in areas between the keys. The thickness of the keymat layer in the areas corresponding to the actuators can be larger than a gap between the actuators and the domes so that a pre-load force can be exerted on the domes. At step 1020, slits can be cut around at least some of the keys in which the slits are cut into the keypad sheet but do not pierce the keymat layer. Optionally, at step 1025, a sealing ring can be formed along at least a portion of an outline of the keypad.

Portions of the mobile device 100 and supporting components can take the form of hardware elements, software elements or elements containing both hardware and software. In one embodiment, the software portions can include, but are not limited to, firmware, resident software, microcode, etc. Furthermore, these software portions can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the system can be centralized or distributed (or a combination thereof) as known to those skilled in the art.

A data processing system suitable for storing program code and for executing program code, which can be implemented in any of the above-referenced devices described herein, can include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. I/O devices (including but not limited to keyboards, displays, pointing devices, etc.) can be coupled to the system either directly or through intervening I/O controllers.

Examples have been described above regarding a keypad and method of manufacturing same. Various modifications to and departures from the disclosed embodiments will occur to those having skill in the art. The subject matter that is intended to be within the spirit of this disclosure is set forth in the following claims.

What is claimed is:

1. A keypad, comprising:
a keypad sheet including:
   a plurality of keys formed on a front side of the keypad sheet; and
   a plurality of actuators formed on a back side of the keypad sheet, the actuators protruding from the back side of the keypad sheet; and
a keymat layer molded onto the back side of the keypad sheet so as to form a barrier to external contaminants, wherein the keymat layer has a larger thickness in areas corresponding to the actuators than in areas between the keys.

2. The keypad according to claim 1, wherein slits are cut around at least some of the keys to provide the keys with flexibility and wherein the slits do not pierce the keymat layer.

3. The keypad according to claim 1, further comprising a sealing ring formed along at least a portion of an outline of the keypad.

4. The keypad according to claim 1, wherein the keypad is installed within a housing of a mobile device and the keymat layer is positioned between the keypad sheet and domes of the mobile device.

5. The keypad according to claim 4, wherein the keymat layer is formed with protrusions in areas corresponding to the actuators, and wherein the protrusions contact the domes such that a contact between the protrusions and the domes provides a pre-load force on the domes.

6. The keypad according to claim 5, wherein the keypad is installed within the housing of the mobile device with the help of grids fitting into areas between the keys of the keypad, and wherein the housing presses on an edge of the keypad and the grids press on the areas between the keys of the keypad to supplement the pre-load force on the domes.

7. The keypad according to claim 1, wherein the keymat layer is made of silicon rubber.

8. A keypad assembly, comprising:
a plurality of domes;
a keypad positioned above the domes, the keypad including:
a keypad sheet having:
a plurality of protruding keys formed on a front side of the keypad sheet and a plurality of key pockets formed on a back side of the keypad sheet, the key pockets corresponding to the keys, wherein slits are cut around at least some of the keys to provide the keys with flexibility; and
a plurality of actuators formed in the key pockets on the back side of the keypad sheet, the actuators protruding from the back side of the keypad sheet; and
a keymat layer molded onto the back side of the keypad sheet so as to form a barrier to external contaminants, the keymat layer being formed with protrusions in areas corresponding to the actuators on the back side of the keypad sheet, the protrusions filling a gap between the actuators and the domes, wherein the slits do not pierce the keymat layer.

9. The keypad assembly according to claim 8, further comprising a sealing ring formed along at least a portion of an outline of the keypad.

10. The keypad assembly according to claim 8, wherein the keymat layer is made of flexible material and has a larger thickness in areas corresponding to the actuators than in areas between the keys.

11. The keypad assembly according to claim 8, wherein the protrusions of the keymat layer contact the domes and the contact provides a pre-load force.

12. The keypad assembly according to claim 11, wherein the keypad assembly is installed within a housing of a mobile device with the help of grids fitting into areas between the keys of the keypad assembly and wherein the housing presses on an edge of the keypad assembly and the grids press on the areas between the keys of the keypad assembly to supplement the pre-load force.

13. A method of manufacturing a keypad, comprising:
forming a keypad sheet by:
forming a film into a shape defining protruding keys on a front side and key pockets on a back side, the key pockets corresponding to the keys; and
molding actuators into the key pockets so that the actuators protrude from the back side of the keypad sheet; and
molding a keymat layer onto the back side of the keypad sheet so that the keymat layer forms a barrier to external contaminants, the keymat layer being formed with protrusions in areas corresponding to the actuators on the back side of the keypad sheet.

14. The method according to claim 13, further comprising: cutting slits around at least some of the keys, wherein the slits are cut into the keypad sheet but do not pierce the keymat layer.

15. The method according to claim 13, further comprising: forming a sealing ring along at least a portion of an outline of the keypad sheet.

16. The method according to claim 13, further comprising: positioning a keypad formed by the keypad sheet and the keymat layer above a plurality of domes, thus forming a keypad assembly, wherein the protrusions fill a gap between the actuators and the domes.

17. The method according to claim 16, wherein the keymat layer is made of flexible material and has a larger thickness in areas corresponding to the actuators than in areas between the keys, and wherein the thickness of the keymat layer in the areas corresponding to the actuators is larger than the gap between the actuators and the domes so that a pre-load force is exerted on the domes.

18. The method according to claim 17, further comprising: installing the keypad assembly within a housing of a mobile device with the help of grids fitting into areas between the keys of the keypad assembly, wherein the housing presses on an edge of the keypad assembly and the grids press on the areas between the keys of the keypad assembly to supplement the pre-load force on the domes.

19. The method according to claim 14, wherein the slits are cut by laser etching.

* * * * *